United States Patent
Harb et al.

(10) Patent No.: US 8,035,261 B2
(45) Date of Patent: Oct. 11, 2011

(54) METHOD AND DEVICE FOR COOLING AN ELECTRIC MACHINE

(75) Inventors: Walter Harb, Weiz (AT); Johannes Erhard, Graz (AT); Ernst Farnleitner, Weiz (AT)

(73) Assignee: VA Tech Hydro GmbH, Wien (AU)

( * ) Notice: Subject to any disclaimer, the term of this patent is extended or adjusted under 35 U.S.C. 154(b) by 0 days.

(21) Appl. No.: 12/306,112

(22) PCT Filed: Jun. 20, 2007

(86) PCT No.: PCT/AT2007/000300
§ 371 (c)(1),
(2), (4) Date: Sep. 21, 2009

(87) PCT Pub. No.: WO2007/147187
PCT Pub. Date: Dec. 27, 2007

(65) Prior Publication Data
US 2010/0026110 A1 Feb. 4, 2010

(30) Foreign Application Priority Data
Jun. 22, 2006 (AT) ............................. A 1061/2006

(51) Int. Cl.
*H02K 9/00* (2006.01)
(52) U.S. Cl. ......................................................... 310/59
(58) Field of Classification Search .............. 310/52, 310/59, 61, 60 A, 64
See application file for complete search history.

(56) References Cited

U.S. PATENT DOCUMENTS

| 5,633,543 | A | 5/1997 | Jarczynski et al. | |
| 5,652,469 | A | 7/1997 | Boardman et al. | |
| 6,201,323 | B1* | 3/2001 | Semba et al. | 310/52 |
| 6,346,753 | B1 | 2/2002 | Jarczynski et al. | |
| 6,737,768 | B2* | 5/2004 | Ide et al. | 310/58 |
| 2003/0034701 | A1* | 2/2003 | Weeber et al. | 310/52 |

FOREIGN PATENT DOCUMENTS

| EP | 1 006644 A2 | 6/2000 |
| EP | 1 408601 A2 | 4/2004 |
| FR | 1022783 | 3/1953 |
| JP | 55-46849 A | 4/1980 |
| JP | 58-107042 A | 6/1983 |
| JP | 58-123348 A | 7/1983 |
| JP | 4-133641 A | 5/1992 |
| JP | 4-340347 A | 11/1992 |
| JP | 6-237554 A | 8/1994 |
| JP | 6-284639 A | 10/1994 |
| JP | 7-87709 A | 3/1995 |
| SU | 855871 | 8/1981 |

OTHER PUBLICATIONS

Search Report dated Jun. 15, 2007.

* cited by examiner

*Primary Examiner* — Hanh N Nguyen
(74) *Attorney, Agent, or Firm* — Nixon & Vanderhye P.C.

(57) ABSTRACT

In a slowly-running electric machine, such as a bulb turbine generator, air circulation for cooling is supplied by externally driven fans. A cooling device is mounted on the pressure or the suction side of the fan and the rotor and the stator are mounted on the suction side of the fan.

9 Claims, 4 Drawing Sheets

METHOD AND DEVICE FOR COOLING AN ELECTRIC MACHINE

CROSS RELATED APPLICATION

This application is the U.S. national phase of International Application No. PCT/AT2007/000300 filed Jun. 20, 2007 which designated the U.S. and claims priority to Austrian Patent Application 1061-2006 filed Jun. 22, 2006, the entire contents of each of which are hereby incorporated by reference.

BACKGROUND

The subject invention relates to a device and a process for the cooling of a stator and a rotor of an electric machine, where a gaseous cooling medium is circulated in a ventilation circuit by means of an externally driven fan.

In air-cooled generators, we differentiate basically between a so-called forward-flow and a reverse-flow cooling system, that is, on principle, according to the direction of flow of the cooling air through the generator. In forward-flow cooling, cold cooling air is extracted from heat exchangers with fans and pressed through the rotor, respectively, the air gap, and then the stator, from which hot cooling air exits and is recirculated via the heat exchanger. In the event of reverse-flow cooling, hot cooling air is extracted from the generator and fed to a heat exchanger, from where the cold cooling air flows to the rotor, respectively, the gap, through the stator.

Reverse-flow cooling systems for turbo-generators are known, for instance, from U.S. Pat. No. 5,633,543 A, U.S. Pat. No. 5,652,469 A, U.S. Pat. No. 6,346,753 B1 and EP 1 006 644 A2. JP 58 123 348 discloses a device and a process for cooling an electric machine with externally driven fans. However, the cooling device is directly mounted on the stator here, so that certain parts of the stator are in the warm air area. This can have negative effects on the width of the air gap between the stator and the rotor, because the edge areas of the stator are especially poorly cooled.

As described in the foregoing, the main characteristic of the reverse-flow cooling systems is suction-cooling of the generator, providing for the warm air being extracted from the generator using a fan and the cold air from the coolers being fed directly to the cooling channels of the generator stator. In most cases, the coolers are arranged on the pressure side of the fans, which is advantageous in that the temperature increase generated by the fans takes place before the cooler inlet and does not cause pre-heating of the generator. The flow in the stator is primarily directed from radially outside to inside and is normally extracted axially along the air gap, because turbo-generators normally have non-salient rotors. Given the high speed at which turbo-generator rotors run, a self-ventilation fan is arranged directly on, and driven by, the rotor shaft to produce the flow that is necessary for cooling.

In slow-running hydro-generators, which normally comprise salient poles, e.g. a bulb turbine generator, basically only externally-driven fans, i.e. fans that are not mounted on the rotor shaft—can be used, because the rotational speed of the rotor shaft would not suffice to produce the cooling air flow with a fan mounted on it. Hydro-generators with two rotating directions (e.g. a motor-generator) could constitute a second application for external ventilation.

Hydro-generators have so far only been operated with a forward-flow cooling system, as has been shown in JP 06 237 554 A2, for instance, where the cooler is mounted on the suction side and the generator on the pressure side of the fans and the flow in the stator is basically directed from radially inside to outside. When self-ventilation is used, a forward-flow-cooling system offers advantages in terms of the fan inflow and outflow. Inflow mostly takes place nearly without spin, which facilitates fan design. The spin-loaded outflow brings in its wake a pre-rotation of the rotor and therefore a reduction of the pressure loss at the rotor inlet (e.g. pole gap inlet).

If external fans are used instead of self-ventilation, these advantages are for the most part s eliminated. Several other disadvantages occur in connection with reverse flow: in hydro generators, especially salient-pole generators, major pressure loss is to be expected at the pole gap inlet. This pressure loss occurs radially outside in the air gap area, instead of radially centrally at the axial end sides as in the case of forward-flow. On account of the major pressure losses that are to be expected, a fan with higher power is needed, which in turn reduces the overall efficiency of the generator. In addition, depending on the arrangement of the fans, some pre-spin can persist at the fan inlet or the fan inlet flow can be more complicated than for the forward flow. It may also be so that the more complex flow at the fan inlet necessitates the use of guidance devices or rectifiers, which makes the cooling system design more complicated. For this reason, hydro-generators have so far not been operated with a reverse-flow cooling system but exclusively with forward flow.

SUMMARY OF THE INVENTION

The subject invention, relates to a reverse-flow cooling system with external fans. The cooling system disclosed herein is a solution that has not been considered so far, disproves the prevailing prejudices and yields the surprising result that when using external fans, the expected disadvantages of reverse-flow cooling are not as grave as is normally feared or that these disadvantages are more than compensated by the advantages arising from this very application.

Use of reverse-flow cooling particularly provides the possibility of better utilization of the stator by a lower cooling air temperature in the stator gaps, for instance, down to 20K, despite the lower heat transfer in the tooth area of the stator gaps. This means that savings can be achieved regarding the high-priced copper material of the stator bars, while keeping to the permitted temperature level. However, in single cases, especially with regard to salient-pole machines, a higher copper cross section can be required for the pole winding due to the higher air temperature in the rotor pole area, but the pole copper material for the rotor winding is less expensive than that for the stator winding. In total, this results in a first advantage for reverse-flow cooling. In addition, due to the lower air temperature in the stator, stator iron can be saved at same performance, whereby the cost of the electric machine is in turn reduced. If the utilization of the electric machine is not increased, lower stator temperatures, and therefore, lower tangential compression strains in the stator core and lower denting risk for the stator are the results. A further advantageous effect of reverse flow is that the difference of the air gap width and the difference of the excitation losses between the cold and the warm states are smaller, because in the case of forward-flow cooling, the rotor heats up less than the stator, so that the temperature difference between the rotor and the stator is larger.

In salient-pole machines, the pressure losses at the pole gap inlet (radially outside) will be larger than for known forward-flow cooling systems (pole gap inlet is radially central). Despite this, this major disadvantage is also compensated by the above-named advantage, so that reverse-flow cooling with external fans can also be used in salient-pole machines.

The reverse-flow cooling system provides several advantageous options for cooling the end windings: (1) Utilization of the warm air that flows out axially from the air gap and possibly from the pole gaps, some of which enters the radially outside end winding area. (2) Some of the cold air that emerges from the cooling device can be fed directly to the end windings of the stator winding via bypasses, which allows better cooling. (3) Serial ventilation of the end winding with suitable air guidance, whereby the cooling air flowing out of the air gap and possibly the pole gaps is led above the end windings, which also reduces rotation and serves to improve the fan outflow.

Improved rotor cooling or reduction of the pressure loss can be achieved by using radial channels, through which cooling medium can flow, in the rotor.

Furthermore, especially in bulb turbine generators, it is advantageous to lead the cooling medium leaving the cooling device between the stator and the casing to the stator gaps. In doing so, the cooling medium will be cooled further by the cold works water flowing on the outside of the generator casing, and which may possibly allow reducing the size of the cooling device.

If the external fans can be arranged on both sides of the generator, reverse-flow cooling with two cooling circuits, each of which covers one axial generator half, is enabled. In this case there is often a simple solution for leading the flow via the end winding and thus fulfilling two purposes: cooling of the end winding and rectification of flow.

SUMMARY OF DRAWINGS

The invention will now be described in the following referring to the exemplary, schematic, non-restricting FIGS. 1 to 6, where.

DETAILED DESCRIPTION OF THE INVENTION

Figure 1:
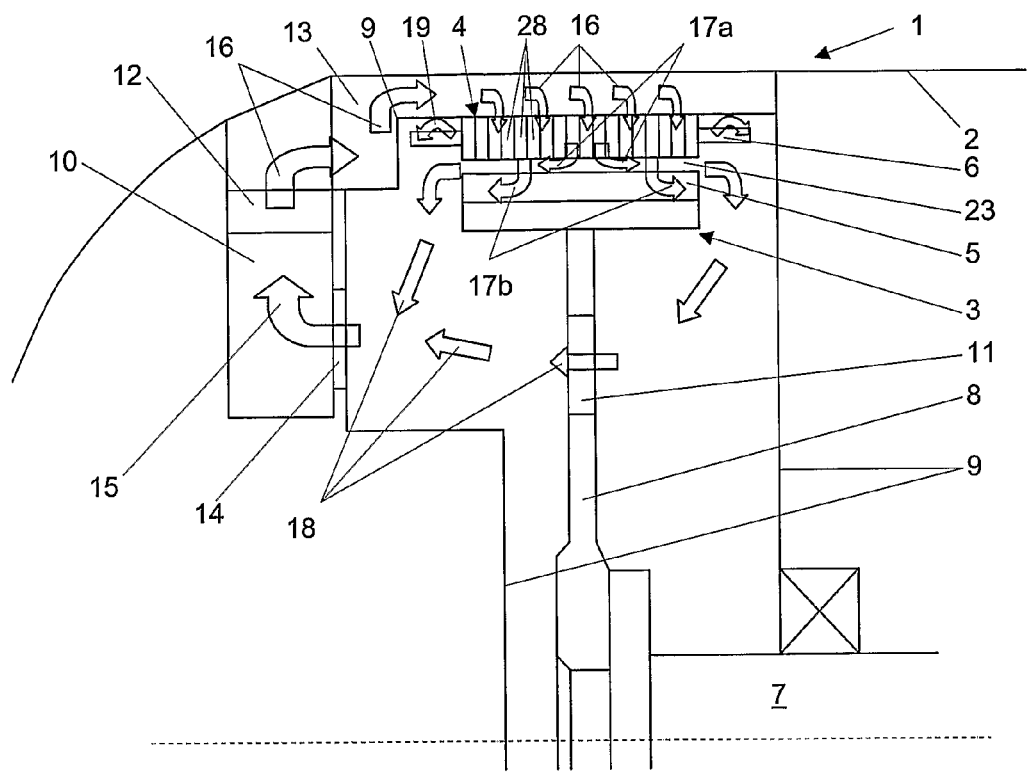
FIG. 1 shows a part of a bulb turbine generator with reverse-flow cooling according to an embodiment of the invention, FIG. 2 a part of a cross-section through the stator and the rotor with salient pole winding in a generator, FIGS. 3 to 5 different variants of reverse-flow cooling and FIG. 6 a part of a further generator type with reverse-flow cooling.

The present invention is described in the following using salient pole generators as an example. FIG. 1 shows a part of the well-known casing 2 of a bulb turbine, in which a generator 1 is arranged. For this purpose, a rotor 3 is fixed to one end of a shaft 7 running in bearings, so that the rotor 3 turns together with the shaft 7. On the other end of shaft 7 and outside casing 2, a well-known turbine (not shown here), for instance, a Kaplan turbine, is mounted, which drives the shaft 7 and therefore also the generator 1.

The rotor 3 comprises a hub spider 8, which is fixed on the shaft 7 and on which the rotor winding 5 is arranged in the known manner. A generator 1 of a bulb turbine is typically a slow-running machine and has a rotor 3 with salient-pole winding, which will be further de10 tailed in respect of FIG. 2.

The stator 4 is fixed to a supporting structure 9 in casing 2 at a distance from casing 2 and co-axially around rotor 3. It is provided with stator windings with axially protruding end windings 6.

The rotor 3 and the stator 4 are structured and arranged in a conventionally and well-known 15 manner. For this reason, this is not addressed in detail here.

On account of the electrical power dissipation, these generators 1 must be cooled in a suitable manner, for instance, with air, as FIG. 1 shows. Here, cooling air is re-circulated by means of a fan 10 in casing 2, so that the cooling air is led over each of the active generator parts, i.e. stator 4, rotor 3, end windings, and is heated there causing the named parts to be cooled at the same time. The warmed-up cooling air is then cooled in a cooling device 12, e.g. a heat exchanger.

The device, according to the invention, for cooling of the generator 1 as presented here comprises a fan 10, which is externally driven, that is to say, it is not mounted on the shaft 7 and not driven directly by it. The fan 10 can be driven, for instance, by a separate electric motor, which is not shown separately here. The fan 10 will extract warm cooling air 15 from the generator area via a suction channel 14, wherein the fan 10 can be, for example, a radial or an axial fan. The warm cooling air 15 is conveyed to a cooling device 12 by the fan 10 at high speed and exits as cold cooling air 16 from the cooling device 12. This cold cooling air 16 is fed to the stator 4 via a feed channel 13, which, in this example, is arranged between the casing 2 and the stator 4 with suitable structural elements 9. The cold cooling air 16 will be squeezed through the stator gaps 28 (see also FIG. 2) of the stator 4, which means that it will be deflected from a basically axial to a basically inward flow. It is also conceivable, however, for the cold cooling air 16 to be led to the stator gaps 28 through axial channels in the stator 4, for instance, if the stator is mounted directly on the inner wall of the casing 2.

The warmed-up cooling air 17 exiting from the stator gaps 28 will be deflected back to the axial direction and flow to the outside through air gap 23 on both sides and in the axial direction, in which process this part of the cooling air 17a is further warmed up. In a rotor with salient-pole winding, the cooling air 17 exiting from the stator will also be squeezed radially into the pole gaps 20 of the rotor 3, in which process this part of the cooling air 17b will be deflected back to the axial direction, warmed up further and also led to the outside axially on both sides. On the axial end of the air gap 23, respectively the rotor 3, the cooling air 18, which has been further warmed up, will exit. A part of this cooling air 19 also passes above the end windings 6 of the stator windings 24, for instance, via suitable deflection plates. The assembled warm cooling air 15 will again be extracted by suction with the help of fan 10, thus closing the cooling air circuit. In doing so, the warm cooling air 18 of the second generator half passes through appropriate openings 11 in hub spider 8.

Figure 2:
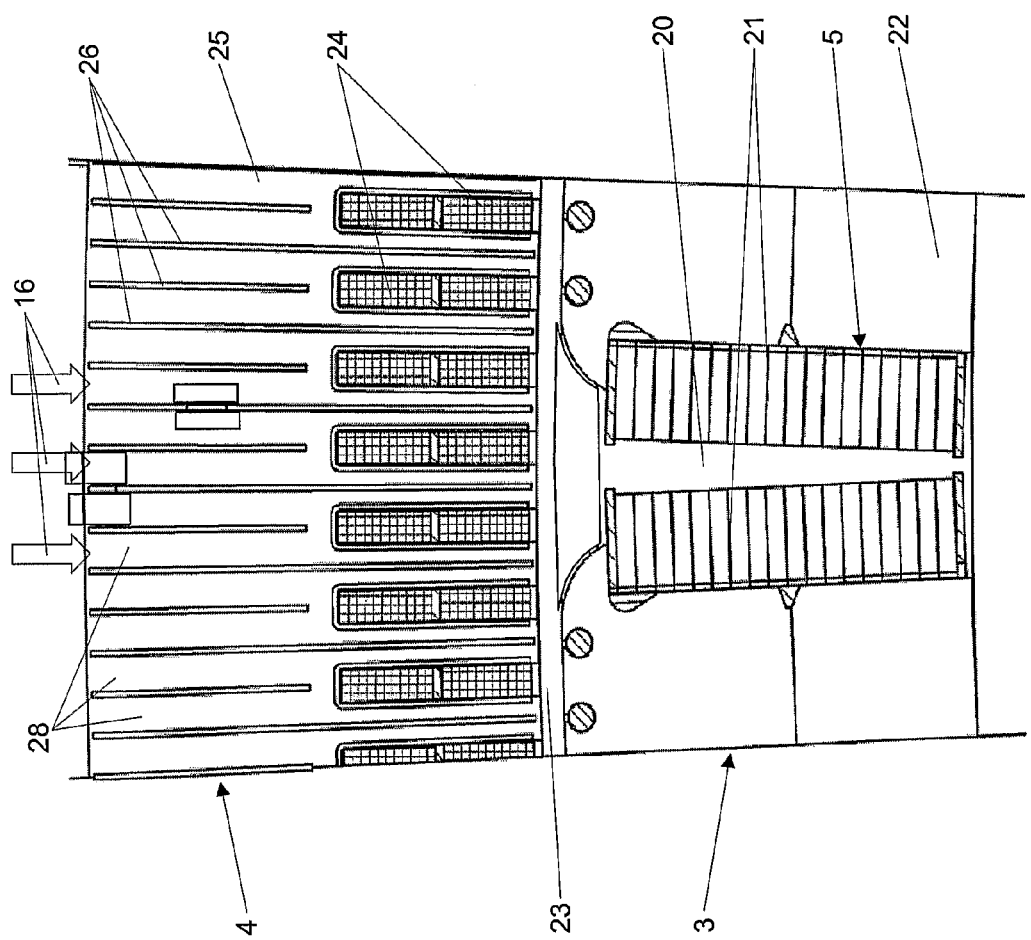

The flow through the stator 4 and the rotor 3 with salient-pole winding is illustrated by means of FIG. 2. The cold cooling air 16 enters the stator gaps 28 of the stator 4 radially. The stator gaps 28, as is well known, are formed by distance bars 26 in the layered stator iron 25. The cooling air 16 flows radially inward (as suggested by the arrows in FIG. 2) toward the stator winding bars 24, which are arranged in grooves in a conventional manner. The cooling air 17, which has now been warmed up, exits the stator 4 radially and is caused to spin by the rotating rotor 3. On the one hand, this warmed-up cooling air 17 will be led outside axially through air gap 23. On the other hand, cooling air 17 will penetrate into the pole gaps 20 which occur in the known manner between the rotor windings 21 arranged in the rotor iron 22 of a salient-pole winding rotor, and will then be led axially outward through the pole gaps 20.

Figure 3:
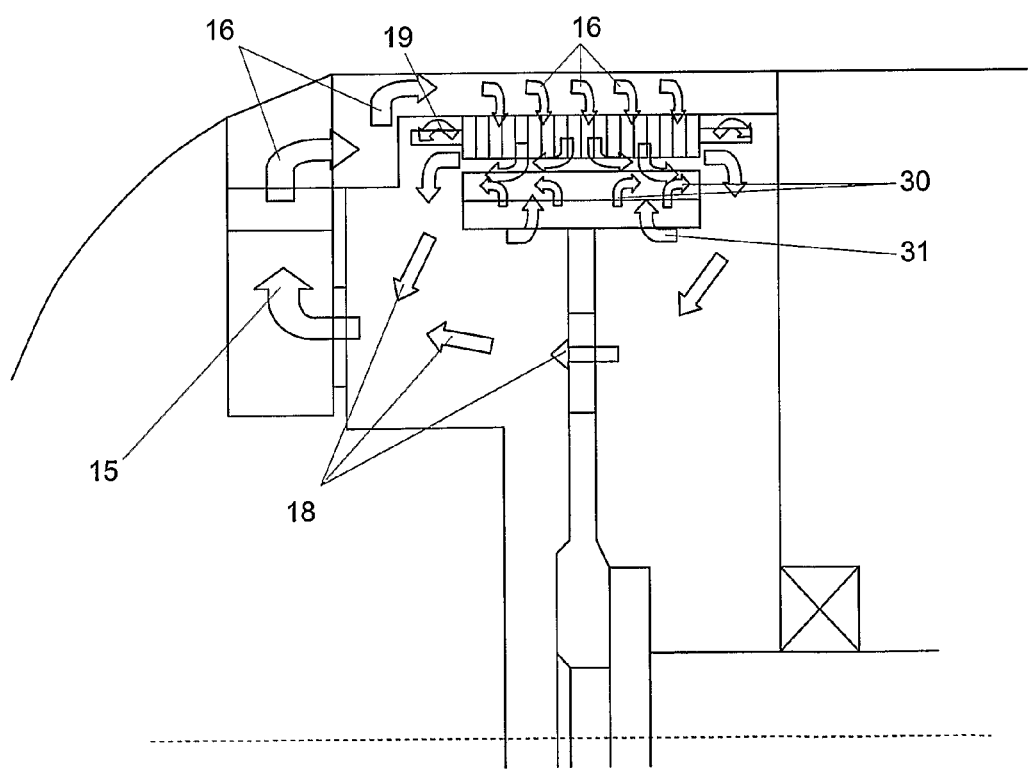
Figure 4:
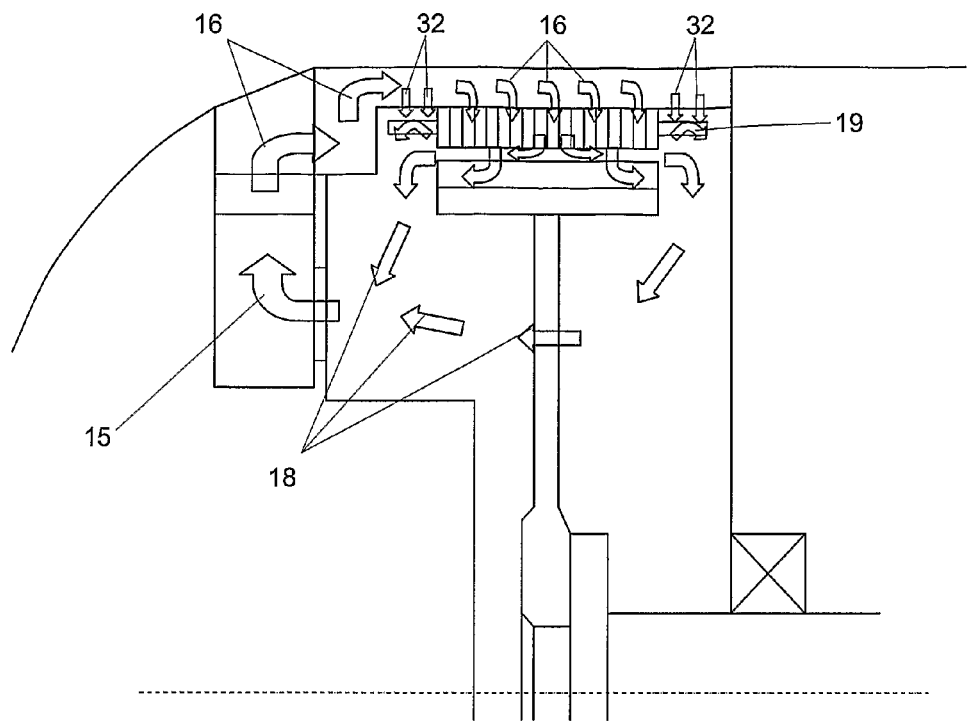
Figure 5:
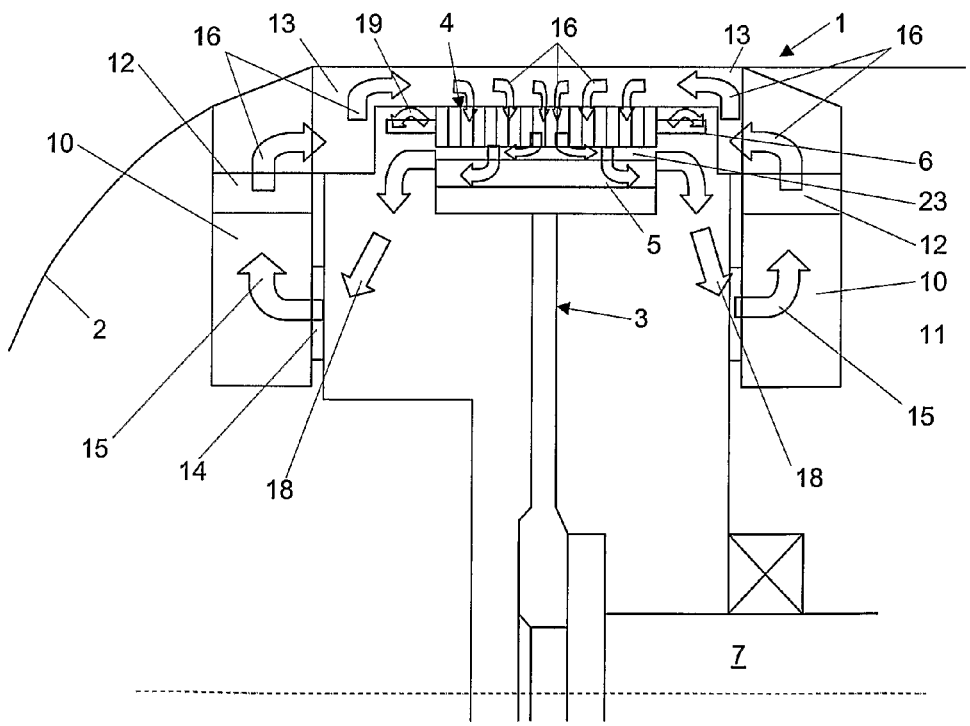

It is naturally possible to make some variations in the cooling circuit, as is described in the following on the basis of FIGS. 3 to 5. For instance, the rotor 3 could also have slots, which would enable radial through-flow in addition to the axial flow. This means that on the one hand, to increase the cooling effect, additional, 3 radially outward cooling air flows 31 could be created through rotor 3 (as FIG. 3 shows), these cooling air flows 31 being in turn led outward axially as axial cooling air flow 20 of the rotor 3 and/or through the air gap 23. On the other hand, an inward-directed radial flow would cause the pressure loss to be reduced on account of the reduction of the axial flow. In addition, cold cooling air 16 could be branched off directly from feed channel 13, and this cold cooling air 32 could be led directly to the end windings 6 of the stator winding 24, as shown in FIG. 4, whereby improved cooling of the end windings 6 would be made possible. For instance, the necessary branchings or boxouts, through which the cold cooling air 16 is led to the end windings 6, could be provided in the feed channel 13. In the same way it would also be possible to provide external fans 10 on each side of the generator 1, as is usual for two-sided ventilation and as shown in FIG. 5, for instance. This creates two separate cooling circuits, each of which covers one half of generator 1, and where it is possible to foresee one cooling device 12 for each circuit or one joint cooling device 12 for the two cooling circuits. Any combination of these variants is also conceivable.

Figure 6:
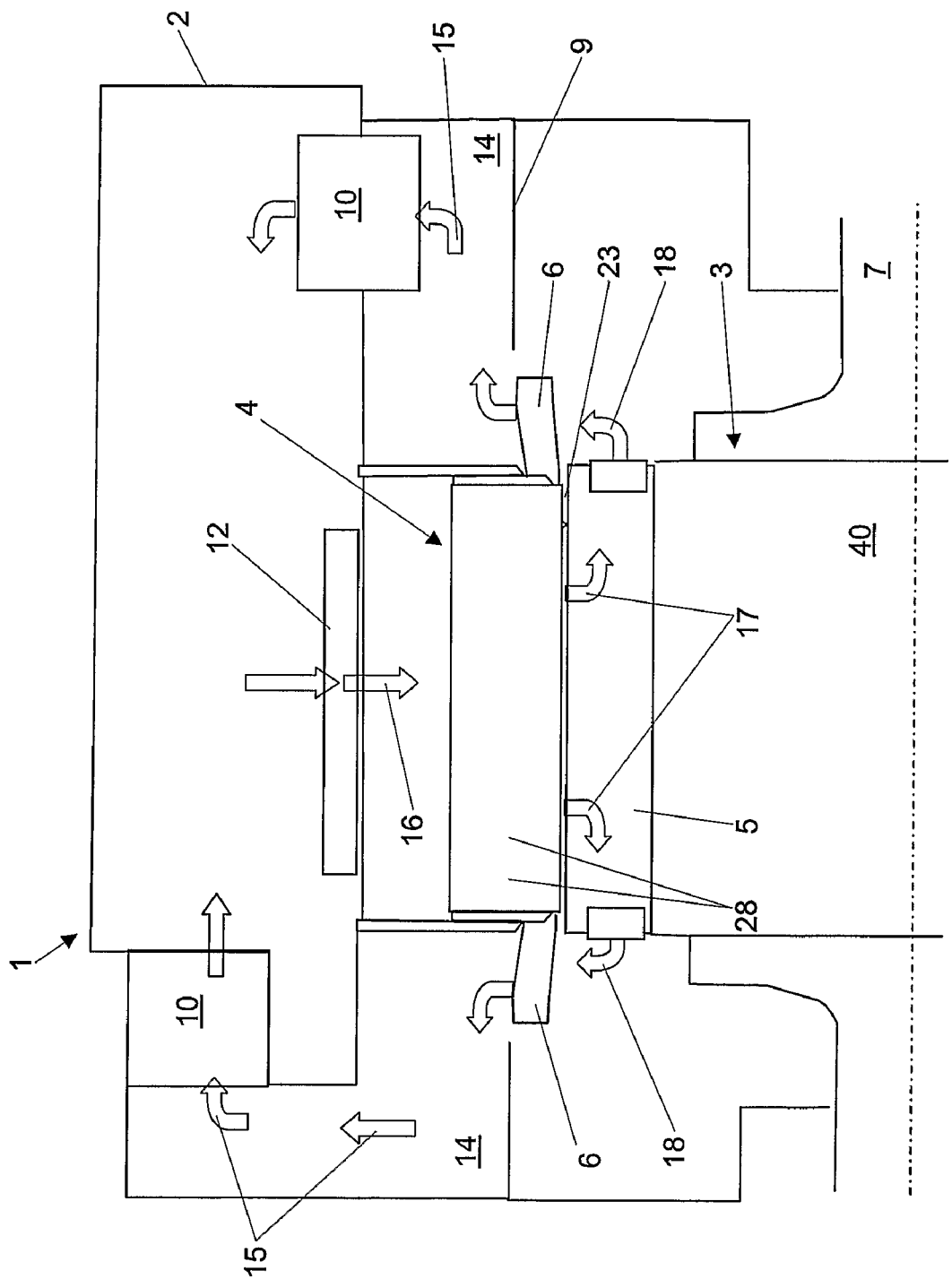

It is also possible to cool a generator 1 with salient-pole winding other than the bulb-generator type, or motors with salient-pole winding, as FIG. 6 shows as an example. The cooling circuit would be the same as described in the foregoing, only the external fan and the cooler would be arranged differently, so that here a serial (two-sided) through-flow of the individual active parts of the electric machine is realized. The warm cooling air 15 flows from the fans 10, which are arranged on both sides in this case, to stator 4 via a cooling device 12. The cooling air 16, which is now cold, will flow through the stator 4 in radial direction through the not clearly shown stator gaps 28. This warmed-up cooling air 17 flows axially outside through the air gap 23 and the pole gaps 20 and further via the end windings 6, an is then sucked in by the fan 10. The flow along end windings 6 reduces the spin in the fan suction area 15. With constructional elements 9, appropriate air guidance is achieved in the generator.

The cooling devices 12 may also be arranged at different points, e.g. at the stator casing shell, as is often done in the case of vertical generators, or in the foundation outside the generator casing, as frequently used for horizontal generators.

In addition, it is naturally also possible to provide several external fans over the circumference, e.g. three for smaller machines and up to twelve and more fans for large machines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method to cool a stator and a rotor with a salient pole winding in a bulb turbine generator comprising:
    circulating a gaseous cooling medium through the bulb turbine generator using at least one fan driven externally of the bulb turbine generator;
    extracting the gaseous cooling medium from the bulb turbine generator by the fan wherein the gaseous cooling medium is warmed by the bulb turbine generator;
    conveying the warmed gaseous cooling medium using the fan to a cooling device to cool the gaseous cooling medium;
    conveying the cooled gaseous cooling medium from the cooling device through a passage between the stator and a casing surrounding the generator, wherein water flowing over an outer surface of the casing cools the casing and the cooled further cools the cooled gaseous cooling medium flowing through the passage;
    conveying the cooled gaseous cooling medium to the stator via a feed channel between the cooling device and the bulb turbine generator;
    passing the cooled gaseous cooling medium radially inward through radial stator gaps in a stator core of the stator;
    after passing through the radial stator gaps, a first portion of the cooling gas flows axially through an air gap between the stator and rotor and a second portion of the cooling gas enters pole gaps and flows axially through the pole gaps, and
    the fan drawing the cooling gas flows axially out of the air gap and axially out of the pole gaps.

2. The method according to claim 1, wherein the first portion of the cooling medium exits axially from the air gap and flows over an end winding of the stator.

3. The method according to claim 1, wherein all of the cooling medium exiting axially from the air gap is guided above an end winding of the stator.

4. The method according to claim 1, wherein at least a portion of the cooling medium exiting axially from the air gap passes through openings in a hub spider of the rotor from one side of the rotor to an other side of the rotor.

5. The method according to claim 1 wherein the second portion of the cooling gas passes through the stator gap thereafter flows through radial channels in the rotor, wherein the radial channels are included in the pole gaps.

6. The method according to claim 1, further comprising directing a third portion of the cooling medium to flow directly from the cooling device and fan to at least one end winding of the stator winding.

7. The method according to claim 1, wherein a another portion of the cooling medium exits the cooling device and flows through stator gaps between the stator and a casing of the bulb turbine generator.

8. The method according to claim 1, wherein the fan comprises a fan at each of opposite sides of the bulb turbine generator and the cooling medium is extracted from the air gap through each of the opposite sides by the fans.

9. A method to cool a stator and a rotor with a salient pole winding in a bulb turbine generator comprising:
    moving a cooling gas through the stator and rotor by an externally driven fan which draws warmed cooling gas from an annular, gap between the rotor and stator;
    after drawing the gas from the annular gap, cooling the warmed cooling gas in a cooling device separate from the stator and rotor;
    moving the cooled cooling gas from the cooling device through a passage between a casing for the generator and an outer circumference of the stator, wherein the movement of the cooling gas through the stator draws the cooling gas from the passage radially inward into the stator, and
    cooling the casing with water flowing over the casing and using the cooled casing to further cool the cooled cooling gas flowing through the passage.

* * * * *